United States Patent
Law et al.

(10) Patent No.: US 8,596,054 B2
(45) Date of Patent: Dec. 3, 2013

(54) ABSORBER-REPLENISHER IN A HYDROSTATIC CIRCUIT

(75) Inventors: Arnold Law, Garland, TX (US); Neil Skoog, Ostrander, OH (US)

(73) Assignee: Atlas Copco Drilling Solutions, Inc., Garland, TX (US)

( * ) Notice: Subject to any disclaimer, the term of this patent is extended or adjusted under 35 U.S.C. 154(b) by 793 days.

(21) Appl. No.: 12/764,344

(22) Filed: Apr. 21, 2010

(65) Prior Publication Data

US 2011/0100717 A1    May 5, 2011

Related U.S. Application Data

(60) Provisional application No. 61/174,772, filed on May 1, 2009.

(51) Int. Cl.
*F16D 31/02* (2006.01)

(52) U.S. Cl.
USPC .................................. 60/414; 60/419

(58) Field of Classification Search
USPC .......................................... 60/414, 419, 456
See application file for complete search history.

(56) References Cited

U.S. PATENT DOCUMENTS

| | | | | |
|---|---|---|---|---|
| 5,878,569 A * | 3/1999 | Satzler | ............................ | 60/419 |
| 7,107,767 B2 * | 9/2006 | Frazer et al. | .................... | 60/414 |

* cited by examiner

*Primary Examiner* — Michael Leslie
(74) *Attorney, Agent, or Firm* — Robert O. Groover, III; Seth A. Horwitz; Gwendolyn S. S. Groover (57) ABSTRACT

Methods and systems for operating an absorber-replenisher to supply fluid to a low pressure circuit in a hydrostatic circuit or recover surplus energy usually wasted across a pressure relief valve in the low pressure side by intensifying it for use in a high pressure circuit in the hydrostatic circuit. The absorber-replenisher 1) allows fluid flow through a high pressure motor-pump section of the absorber-replenisher from a high pressure circuit source causing a low pressure motor-pump section to turn providing additional fluid flow to the hydrostatic circuit, or 2) allows increased fluid flow from the low pressure portion of the hydrostatic circuit to increase pressure until the higher pressure induces a higher net torque of the low pressure motor-pump section to reverse the direction of the absorber-replenisher and pump fluid flow into a high pressure circuit through the high pressure motor-pump section.

20 Claims, 7 Drawing Sheets

Diagram 1

FIG. 4A Diagram A Extending

FIG. 4B Diagram B Extending

Diagram D retracting with resistive load

ABSORBER-REPLENISHER IN A HYDROSTATIC CIRCUIT

CROSS REFERENCE TO RELATED APPLICATIONS

This application claims priority from provisional patent application 61/174,772, filed on May 1, 2009, which is hereby incorporated by reference.

BACKGROUND

The present application relates to hydraulic systems, and more particularly to an absorber-replenisher apparatus in hydrostatic circuits in a drilling rig.

During the extend cycle of a single rod hydraulic cylinder in a hydrostatic circuit, a large quantity of fluid flow is required to make up for the loss of fluid flow due to the differential area of the two sides of the single rod cylinder piston. During the retract cycle, the same fluid flow must be diverted to the reservoir. The ratio of the volume on either side of the hydraulic cylinders changes as the cylinder extends or contracts.

Typically in prior art designs, when extending, a large auxiliary pump is used to provide the fluid flow making up the differential oil loss. When retracting, the fluid flow from the pump is diverted through a relief valve along with the surplus fluid to make up the differential oil loss. The amount of energy wasted (i.e., power lost) is a function of the total fluid flow and the replenishing relief pressure setting. Such a setup adds complexity to the hydrostatic circuit.

SUMMARY

The present application discloses new approaches to operating a hydrostatic circuit in a drilling rig more efficiently to avoid wasting energy.

In some embodiments, the inventions include an absorber-replenisher that can provide large replenishing fluid flow utilizing a small amount of flow from a secondary hydraulic system during the extend cycle. During the retract cycle, the fluid is pumped back into the secondary hydraulic system, and the energy that is usually lost across a relief valve is converted into mechanical energy driving the absorber-replenisher. The absorber-replenisher uses torque on the shaft from the differential pressure between a high-pressure side and a low-pressure side to either cause fluid to flow into a manifold or fluid to exit the manifold. The absorber-replenisher can be used on the hydraulic systems in the rig, such as in the top drive, mast, other auxiliary functions, and in the pipe-handling system.

The disclosed innovations, in various embodiments, provide one or more of at least the following advantages. However, not all of these advantages result from every one of the innovations disclosed, and this list of advantages does not limit the various claimed inventions.

Less energy use and complexity from eliminating the auxiliary pump.
More efficient energy usage in the hydrostatic circuit.
Lower energy and power loss.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 shows a drawing of an exemplary drilling rig the inventions are useful in.

DETAILED DESCRIPTION OF SAMPLE EMBODIMENTS

The numerous innovative teachings of the present application will be described with particular reference to presently preferred embodiments (by way of example, and not of limitation). The present application describes several inventions, and none of the statements below should be taken as limiting the claims generally.

Figure 1:
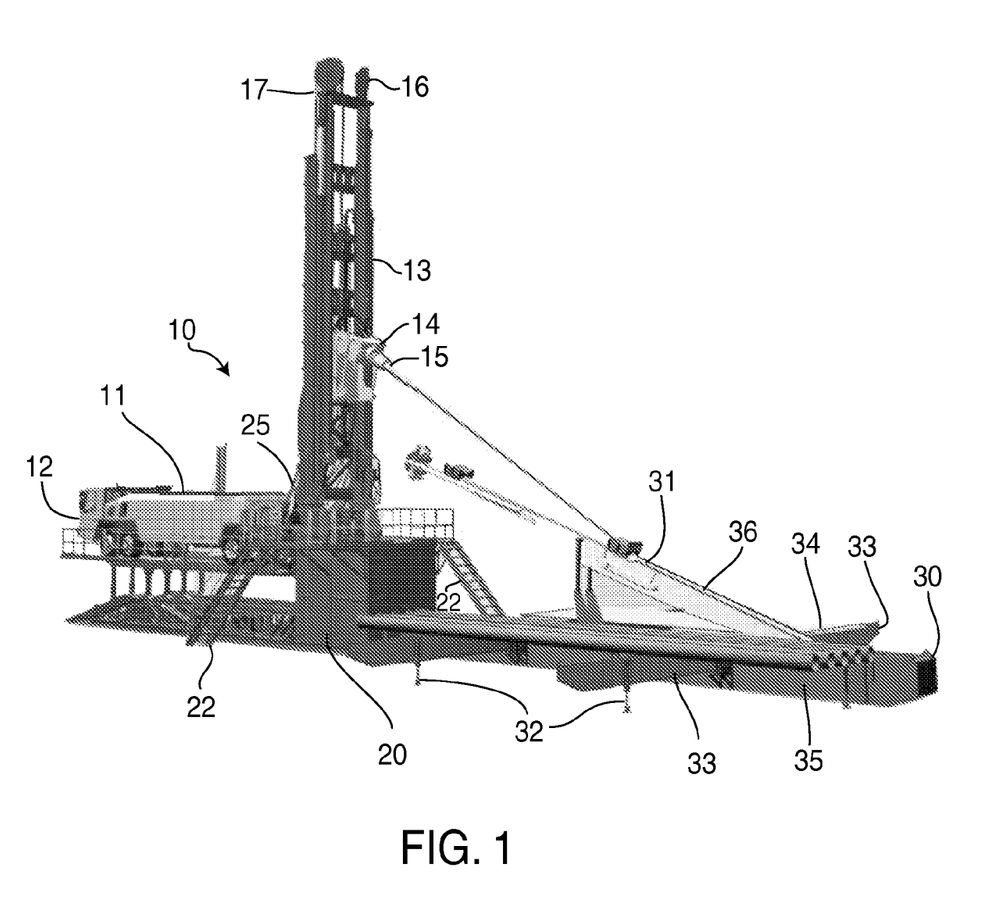

The exemplary drilling rig depicted in FIG. 1 is a new generation drill for the oil and gas industry. This innovative drilling rig system includes three primary structural components: a mobile rig (10), a substructure (20), and a pipe handling skate (30). The three components are designed to provide a modular, highly mobile drilling system, offering improved drilling performance, lowering operating cost, and enhancing safety. The modular drilling system exhibits exceptional mobility with vastly reduced rig-up time, greatly reducing non-drilling time and cost, improved performance, greater energy efficiency, and enhanced safety in all facets of operation.

The exemplary top-drive rig possesses an actual working hook load capacity of 200,000 lb (90,719 kg) and the flexibility to drill vertical, directional and horizontal wells. In most prior art systems, the rigs can only perform actual drilling operations for approximately half the time it is deployed for a drilling assignment. These older designs rig spend the remainder of the time mobilizing, rigging up, handling pipe, and standing by while other operations occur. This design focuses on reducing non-drilling time and costs, increasing operating performance, and enhancing safety.

Enhancements of this design include a virtually hands-free breakout and pipe handling system 31 requiring minimal manual intervention and eliminating the need for personnel in the mast during drilling operations. Another enhancement includes a hydraulic floor crane on the substructure 20 assisting rig up and drilling operations, which reduces heavy lifting and additional manual intervention The exemplary drilling system can be utilized in a mixed fleet approach which permits land-based drilling to capitalize on the strengths of two types of drilling rigs: lightweight mobile rigs and deep-hole conventional rigs. The lightweight hydraulic top-drive exemplary rig drills surface holes and pre-sets casing. The larger rig follows on and drills the deeper segment of the well, which allows both rigs to perform at maximum efficiency. Each rig completes its portion of the drilling plan in the least amount of time and at the lowest possible cost. This approach results in a considerable savings in mobilization costs, rig-up time, setting surface casing, tripping pipe, and rig down.

Component Overview
Hydraulic Carrier Drive

The exemplary drilling rig shown in FIG. 1 uses a unique single-engine hydraulic carrier-drive system 11 to power the rig's existing systems. The carrier 11 design possesses a full-width, low-profile cab 12 with all of the amenities found in conventional trucks. A single 950 hp (708 kw) engine powers both the carrier and the drilling rig's hydraulic and electrical systems utilizing shared components rather than a second engine plus drive train. This unique design greatly reduces weight as well as time and cost for maintenance.

In drive mode, the engine consumes less than half of its rated power and is capable of full torque at any time, regardless of speed. The hydraulic drive, coupled with a clutch and manual transmission, provides a wide range of power and speeds, equally effective on flat land or mountainous terrain. A dynamic braking system provides both improved quiet and efficient operation compared to conventional braking systems. The carrier 11 also possesses a creep mode feature that gives the driver precise control and vehicle placement in off-road or extreme driving conditions.

Mobile Drill Rig

The disclosed exemplary rig 10 is a mobile, self-contained rig with a 200,000 lb (90718 kg) hook load capacity. It incorporates a unique telescopic mast 13 that reduces overall rig-transport length while maintaining the capability to handle both pipe and casing. The pipe handling and breakout system 31 is virtually hands free. Its dual-range hydraulic top-drive 14 tips out to handle drill pipe and casing with a 0° to 90° tip out design. The rig also possesses an integrated iron roughneck 21 and hydraulic slips. The drill operator can set a top-drive torque limit control to a maximum torque limit so that every joint of pipe and casing is made up to exact specification. The design allows the rig to push, pull, rotate, and flush tubulars.

The mast 13 and substructure 20 are engineered to API 4-F with a 3 to 1 safety factor over maximum hook load. A hydraulic cylinder hoisting and pulldown system provides high mechanical and hydraulic efficiency, which may reduce operating cost. The hoisting and pulldown system operates using a dual hydraulic cylinder feed and hoisting configuration. Cables 17 reeved over large diameter traveling sheaves 16 raise the top-drive 14 to the top of the mast 13 at maximum extension. The electronic control system is designed to be precise and reliable. An "on demand" hydraulic system allows the driller to allocate power to various drilling systems as needed. This capability can improve drilling performance and reduce operating cost. The operator's console and monitor can be placed either on the work floor or in a drill cabin. The rig provides the operator with real-time surface and down-hole information to maximize drilling performance at all times.

Substructure

The rig substructure 20 serves as a strong, structural base for the rig and makes up an integral part of the drilling system. The substructure design allows rapid rig up with reduced manual labor and assembly. The substructure 20 includes as integrated components the table, master bushing, hydraulic slips, and iron roughneck 21. Four hydraulic blocking jacks permit simple, fast leveling. A self-contained electric-hydraulic power pack system deploys the drive-on ramps and catwalks on the substructure. The blowout preventer (BOP) stack can be transported with the substructure. A hydraulic crane, with a telescoping boom, assists with rig up and utility lifting during drilling operations. A remote controlled crane boom can be positioned over hole center or can reach off the work floor to pick up loads from the ground. The main air/mud manifold is also located on the substructure for quick ground level hook up.

The substructure forms a large 190 ft$^2$ (17.6 m$^2$) work floor designed to provide ample working space and configured with drill-crew efficiency and safety in mind. Two access stairways 22 hinged at the top can adjust to substructure height, while keeping the bottom end firmly on the ground.

Because the substructure 20 comprises a single load, deployment requires less assembly and manual labor than prior art substructures, reducing non-drilling time and cost.

Skate

The rig's skate 30 forms a complete pipe handling system designed to work with the rig 10 and substructure 20. It comprises a single skid-mounted load attached directly behind the substructure 20. The skate design allows handling of drill pipe, collars, and casing. The skate 30 can handle 30 ft (9 m) or 40 ft (12 m) oil field drill pipe as well as lengths of casing up to 24 inches (610 mm) in diameter. Hydraulic jacks 32 make set up and alignment quick and simple. The skate possesses foldout pipe racks 33 on both sides to store pipe 34 and casing 35. These racks 33 use hydraulic jacks so pipe will roll onto the skate when drilling and off the skate when tripping out. Alternatively, the skate configuration can omit racks and use hydraulic pipe tubs or simple A-frame racks to load and unload the skate.

The control system for pipe handling can be located on the work floor and/or at ground level. An operator handles the loading operation on the skate 30 and elevates the pipe to a fixed position behind the work floor on a trough 36. A hydraulic clamp on the end of the trough 36 grips the pipe, and the clamp extends to meet the spindle 15 for make up. After the joint is made up, the operator opens the clamp and retracts it into the trough 36. The operator then lowers the trough 36 and loads the next pipe 34 or casing 35 from the racks 33. A big advantage of this totally automated pipe handling system is the ability to maintain a constant, fast pipe-handling speed without tiring crewmembers.

The disclosed integrated drilling system offers contractors a lightweight, mobile package that can be mobilized and rigged up quickly. It can drill vertical, directional, and horizontal exploration and production wells in the 6,000-10,000 ft (1800-3000 m) depth range, and can handle drilling and casing surface and intermediate holes for deeper wells.

The disclosed absorber-replenisher innovations are particularly useful in applications where a hydrostatic pump provides power to single rod hydraulic cylinder circuits. The absorber-replenisher uses torque on the shaft from differential pressure between a high-pressure side (e.g., 4700 psi) and a low-pressure side (e.g., 250 psi) to either cause hydraulic fluid to flow into a manifold or hydraulic fluid to exit the manifold depending on the rotation direction induced by the torque differential. In effect, the absorber-replenisher acts as a hydraulic transformer, stepping the pressure down and avoiding heating and energy loss. The recovery of energy to provide power is an example of green technology. The absorber-replenisher can be used on the hydraulic systems on the exemplary rig described, such as in the top drive, other auxiliary functions, and in the pipe handling system. It also should be noted that the absorber-replenisher is not an accumulator.

Description of Absorber-Replenisher in Hydraulic Circuits

An exemplary absorber-replenisher consists of a pair of hydraulic pump-motors connected via a common shaft. The inlet of the first pump-motor section is connected to a hydraulic reservoir, and the outlet is connected to a medium to low pressure hydraulic circuit. The inlet of the second pump-motor is connected to a high pressure hydraulic circuit, and the outlet is connected to the same medium to low pressure hydraulic circuit as the first pump-motor section.

By selecting the correct ratios between the two sections, the absorber-replenisher supplies fluid to the medium to low pressure circuit or recovers surplus energy, that is usually wasted across a pressure relief valve, in the medium to low pressure circuit by intensifying it for use in the high pressure circuit. The ratio between the low to medium pressure hydraulic circuit and the high pressure hydraulic circuit is selected based on the operating pressure of the high pressure circuit and the replenishing pressure of a coupled hydrostatic circuit. One or both of the pump-motor sections can have either a fixed or variable displacement design to provide optimum energy recovery.

Basic Theory of Operation

Figure 2:
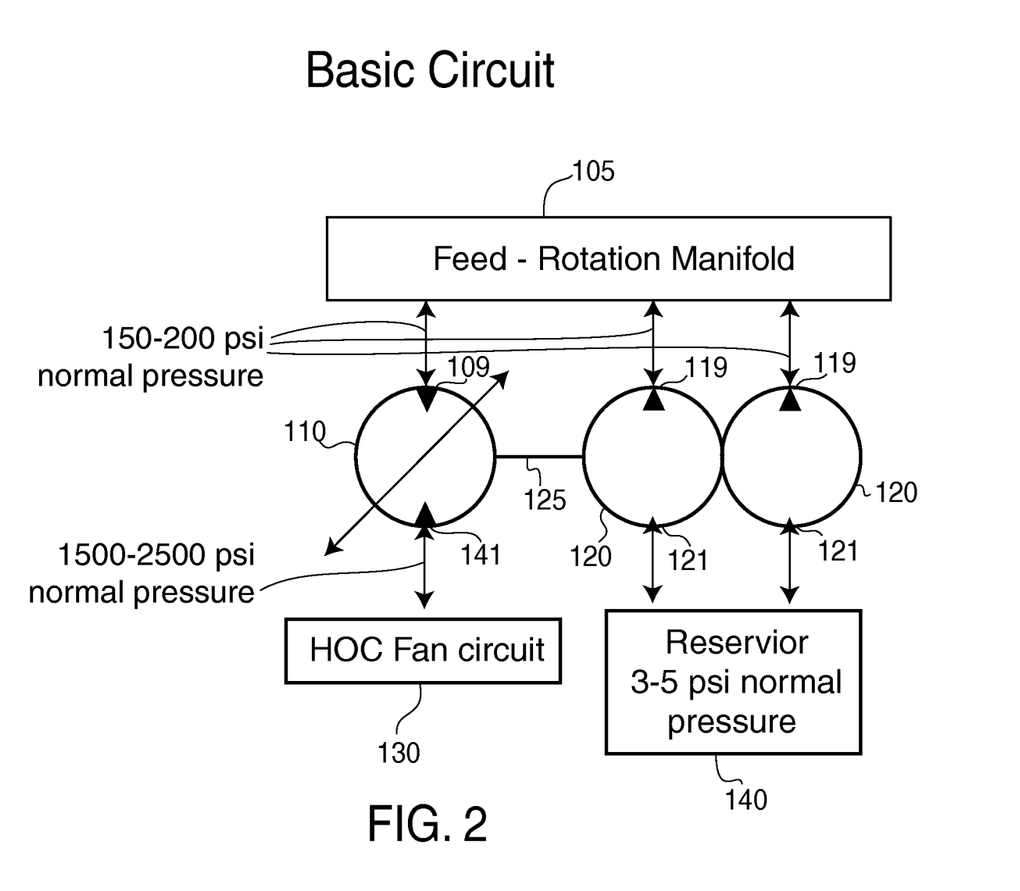
FIG. 2 shows a schematic of an embodiment of basic absorber-replenisher circuit.

Referring to the basic circuit of the absorber-replenisher in FIG. 2, a low pressure port 109 of a variable displacement bidirectional hydraulic pump-motor 110 connects to a low pressure side (e.g., 150-250 psi) of an operating hydrostatic circuit using a feed rotation manifold 105. A high pressure port 111 of a variable displacement bidirectional hydraulic pump-motor 110 connects to a hydraulic motor powering a fan on an hydraulic oil cooler (HOC) i.e., a HOC fan motor circuit 130, at a high pressure (e.g., 1500-2500). A determined pressure differential between the two sides induces a torque on the pump-motor 110.

A common shaft 125 connects to a pair of fixed displacement unidirectional hydraulic pump-motors 120. Low pressure ports 119 of the fixed displacement unidirectional hydraulic pump-motors 120 connect to the low-pressure side (e.g., 150-250) of the operating hydrostatic circuit using a feed rotation manifold 105, and reservoir ports 121 connect to a hydraulic fluid reservoir at low nominal pressure (e.g., 3-5 psi). A determined pressure differential between the two sides induces a torque on the pump-motor 120.

The absorber-replenisher uses the torque on the shaft resulting from the differential pressure on the hydraulic pump-motors to either cause fluid to flow into the manifold 105 or allow it to exit the manifold 105. If the manifold pressure is low, the pressure differential on the hydraulic pump-motor 110 (e.g., piston motor) causes it to rotate the hydraulic pump-motors 120 (e.g., gear pumps) to add fluid into the manifold 105. If the manifold pressure is high, the differential pressure on the gear pumps 120 will cause them to act as motors, rotating the piston motor 110 to pump fluid into the HOC fan motor circuit 130.

Torque Calculations and Rotation of the Absorber-Replenisher

As exemplary torque values, it is assumed the piston motors displacement is 2.33 cu.in/revolution, and the combined gear pumps displacement is 26.84 cu.in/rev.

Piston Motor displacement=2.33 cu.in/rev (55 cc's/rev)

Combined Gear pump displacement=26.84 cu.in/rev $$\text{Torque (in-lb)} = \frac{\Delta \text{Pressure} \times \text{displacement}}{2 \text{ Pi } (6.28)}$$

The direction to the common drive shaft is the balance of the two torques.

$T=(2.33\times(F-M))-(26.84\times M)$

Manifold Pressure=M

Fan motor pressure=F

Reservoir pressure=0 (for basic calculations)

2 Pi value cancels out for balance equation.

Determining the balance:

$T=(2.33\times(F-M))-(26.84\times M)$

Set F to 2500 psi $T=5825\times 2.33M-26.84M$ $T=5825-24.51M$ $T=0$ when $M=238$ psi Balance of the torques occurs at a manifold pressure of 238 psi. If M<238 psi, then T is positive and oil flows into the manifold 105. The torque of the piston motor 110 overcomes the resistance torque of the gear pumps 120. The piston motor 110 rotates to drive the gear pumps 120, causing oil to flow from the reservoir into the Feed-rotation manifold 105. Therefore, the pump-motors are functioning as a replenisher.

If M>238 psi, then T is negative and the oil flows out of the manifold 105. The torque of the combined gear pumps 120 is greater than the torque of the piston motor 110. The gear pumps 120 become motors and reverse the shaft rotation to the piston motor 110, causing some oil to flow into the HOC fan motor circuit 130 and the balance to return to the reservoir 140. Therefore, the pump-motors are functioning as an absorber.

If the value for F is changed, the M value is also changed. Lowering the Fan motor pressure causes the Torque balance to occur at a lower manifold pressure. For example, if F=1500 psi then M=143 psi.

Description of Typical Operation

Figure 3:
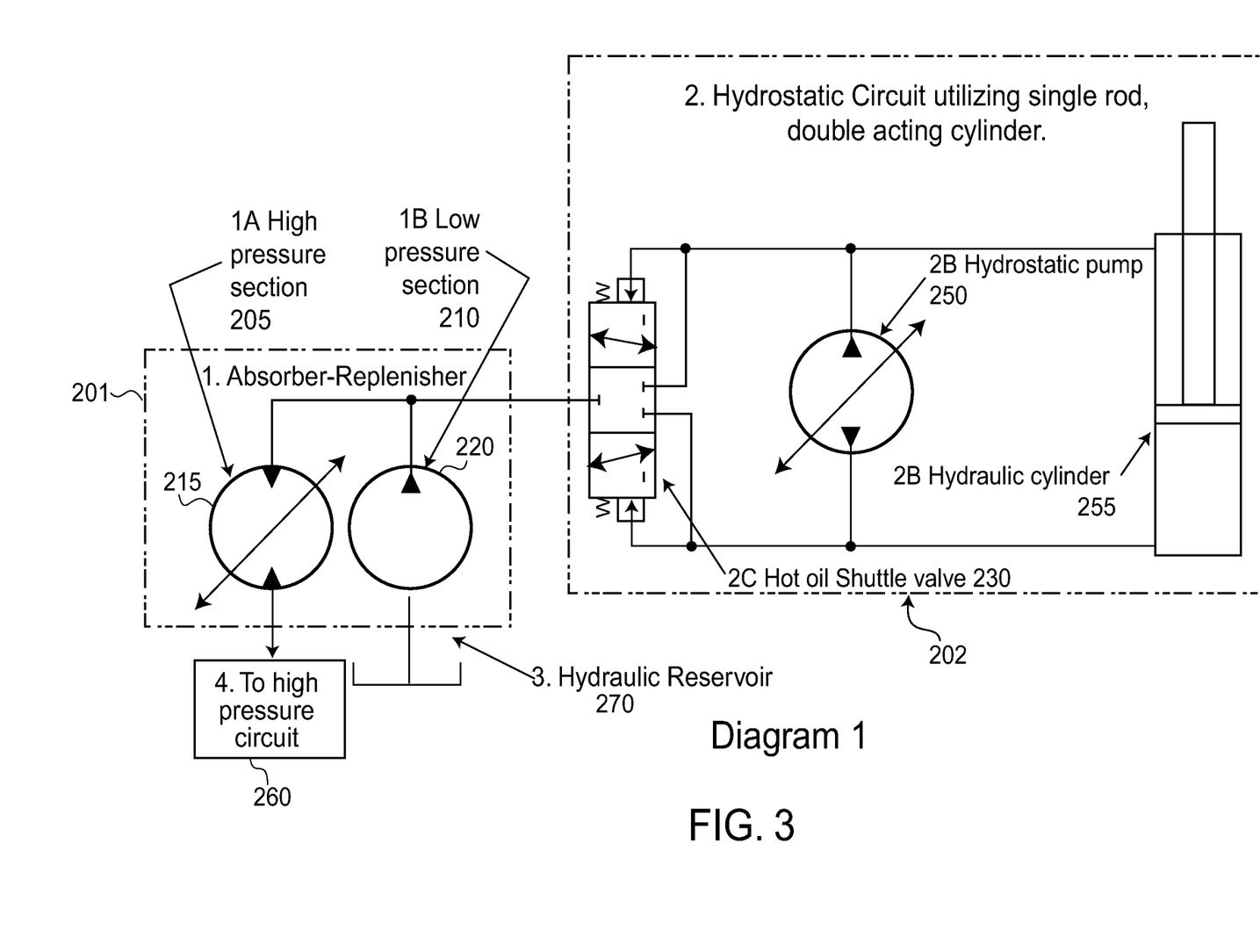
FIG. 3 schematically shows an absorber-replenisher coupled to a hydrostatic circuit.

Referring to FIG. 3, an exemplary absorber-replenisher (1) 201 connects to a typical hydrostatic cylinder circuit (2) 202 as shown. The high pressure section (1A) 205 of the absorber-replenisher 201 connects to a second high pressure circuit (4) 260 and the hot oil shuttle valve port (2C) (e.g., a manifold) 230 of the hydrostatic circuit (2) 202. The low pressure section (1B) 210 of the absorber-replenisher (1) is connected between the reservoir (3) 270 and the hot oil shuttle valve (2C) 230. Thus, there is a low pressure port on the high pressure section 205 pump-motor 215 and a low pressure port on the low pressure section 210 pump-motor 220. Both sections connect to the low pressure side of the hydrostatic circuit through this common port. The low pressure section (1B) 210 connects to a hydraulic reservoir through a reservoir port, and the high pressure section (1A) 205 connects to a high pressure circuit (4) 260 through a high pressure port.

The ratio of the two torques on the two pump-motors (1A) 215 and (1B) 220 due to the differential pressure on the absorber-replenisher 201 is selected based on the operating pressure of the high pressure circuit (4) 260 and the replenishing pressure of the hydrostatic circuit (2) 202. In some embodiments, the high pressure section 205 pump-motor 215 can be a variable displacement bidirectional hydraulic pump-motor, and the low pressure section 210 pump-motor 220 can be a fixed displacement unidirectional hydraulic pump-motor.

When the hydrostatic pump (2A) 230 is commanded to supply fluid flow to the large area of the hydraulic cylinder (2B) 255 causing it to extend, it opens the hot oil shuttle valve (2C) 230 to connect the absorber-replenisher (1) 201 to the low pressure rod side of the hydrostatic circuit (2) 202. A reduced fluid flow volume is returned from the smaller annulus area of the cylinder 255, and the lack of replenishment flow causes the pressure to drop in the inlet of the hydrostatic pump (2A) 250. Fluid flow through the high pressure section (1A) 205 of the absorber-replenisher (1A) 201 from high pressure circuit source (4) 260 causes the low pressure section (1B) 210 to rotate (via the common/coupled shaft), providing additional fluid flow to the hydrostatic circuit (2) 202 from the hydraulic reservoir (3) 270 and the high pressure circuit (4) 260. Once the replenishing fluid flow increases pressure to achieve the appropriate value to balance the torque on the two pump-motors 215 and 220, the absorber-replenisher (1) 201 stalls due to the equilibrium of the differential torque across the high and low pressure side, respectively, of the high-pressure section (1A) 205.

When the hydrostatic pump (2A) 250 is commanded to supply fluid to the smaller annulus area of the hydraulic cylinder (2B) 255 causing it to retract, it opens the hot oil shuttle valve (2C) 230 to connect the low pressure side cap of the hydrostatic circuit (2) 202 to the absorber-replenisher (1) 201. The increased fluid flow volume from the large cap area of the hydraulic cylinder (2B) 255 cannot be absorbed by the hydrostatic pump (2A) 250, and the pressure in the low pressure portion of the hydrostatic circuit (2) 202 increases from the increased fluid flow.

When the lower pressure at the inlet of the low pressure section of the absorber-replenisher (1) 201 is sufficient, the higher net torque of the low pressure section (1B) 210 reverses the direction of the absorber-replenisher (1) 201 to pump fluid from the hot oil shuttle valve (2C) 230 into the high pressure circuit (4) 260 through the high pressure section (1A) 205, and into the hydraulic reservoir (3) 270 through the low pressure section (1B) 210. This occurs because the torque differential between the common ports connected to the low pressure side of the hydrostatic circuit (2) 202 of the absorber-replenisher 201 and the reservoir connection is greater than the torque differential between the common port and the high pressure connection. Therefore, low pressure section (1B) 210 rotates to force fluid into the high pressure connection by rotating the high pressure section (1A) 205. Torque to provide the increased pressure reversing the absorber-replenisher (1) 201 is generated by a portion of the fluid flow directed through the low pressure section (1B) 210 to the reservoir (3) 270. Once the absorbing fluid flow decreases pressure to achieve the appropriate value balancing the torque on the two pump-motors 215 and 220, the absorber-replenisher (1) 201 stalls due to the equilibrium of the differential torque across the reservoir side and low pressure side, respectively, of the low pressure section (1B) 210.

Figure 4A:
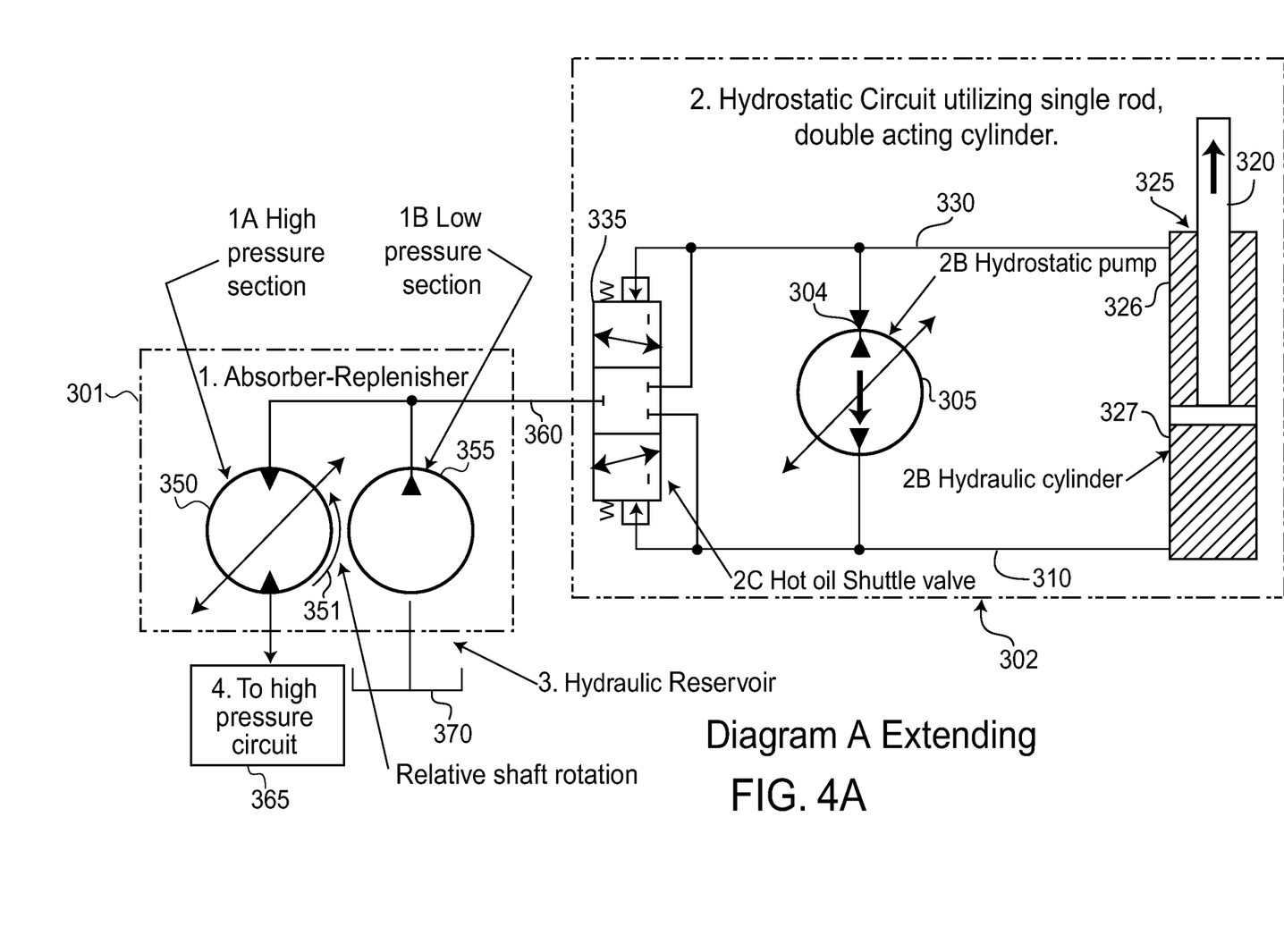
FIGS. 4A-D schematically demonstrate operation of the absorber-replenisher coupled to a hydrostatic circuit of FIG. 3.

FIG. 4A shows an exemplary embodiment for operation when the hydrostatic circuit operates to extend the cylinder rod in a double acting cylinder. The hydrostatic pump 305 supplies fluid to the high-pressure side 310 of the hydrostatic circuit 302 supplying hydraulic pressure to extend the single rod 320 of the of the double acting hydraulic cylinder 325. The supply fluid flow to the large area 327 of the hydraulic cylinder 325 causes it to extend, and it opens the hot oil shuttle valve 335 to connect the absorber-replenisher 301 to the low pressure side 330 of the hydrostatic circuit 302, draining the smaller annulus rod side 326 of the hydraulic cylinder 325. A reduced fluid flow volume is returned from the smaller annulus area 326 of the cylinder 325.

The low pressure side 360 of the absorber-replenisher 301 connects to the low pressure smaller annulus side 330 of the hydrostatic circuit 302. Because of the reduced fluid volume in the hydrostatic circuit due to the volume differential between the smaller annulus rod side 326 and the large area 327 of the hydraulic cylinder 325, a reduced fluid flow volume is returned from the smaller annulus area 326 of the cylinder. The lack of replenishment flow causes a pressure drop in the inlet 304 of the hydrostatic pump 305. This likewise causes a pressure drop in the low pressure side 360 of the absorber-replenisher 302, increasing the pressure differential across the high pressure section variable displacement bidirectional hydraulic pump-motor 350. The changing pressure differential unbalances the torque causing the variable displacement bidirectional hydraulic pump-motor 350 (e.g., piston motor) to rotate as fluid flows from a high-pressure circuit 365 (e.g., HOC fan circuit).

The fluid flow through the high pressure section 350 of the absorber-replenisher 302 from the high pressure circuit source 365 causes the high pressure section hydraulic pump-motor 350 to rotate due to the induced torque. As the common (or linked) shaft rotates the low pressure section fixed displacement unidirectional hydraulic pump-motor 355 (e.g., gear pump), it pumps additional fluid into the hydrostatic circuit 302. The negative rotation 351 pumps hydraulic fluid from the hydraulic reservoir 370 into the low pressure side 360 of the absorber-replenisher 302, through the hot oil shuttle valve 335, and into the low pressure side 330 of the hydrostatic circuit 302. Once the replenishing fluid flow increases the pressure in the low pressure side 330 of the hydrostatic circuit 302 to the appropriate value to balance the torque operating on the high pressure section pump-motor 350, the absorber-replenisher 302 stalls due to the equilibrium of the differential torque across the high pressure side 365 and the low pressure side 360, respectively, which ceases the negative rotation 351.

Figure 4B:
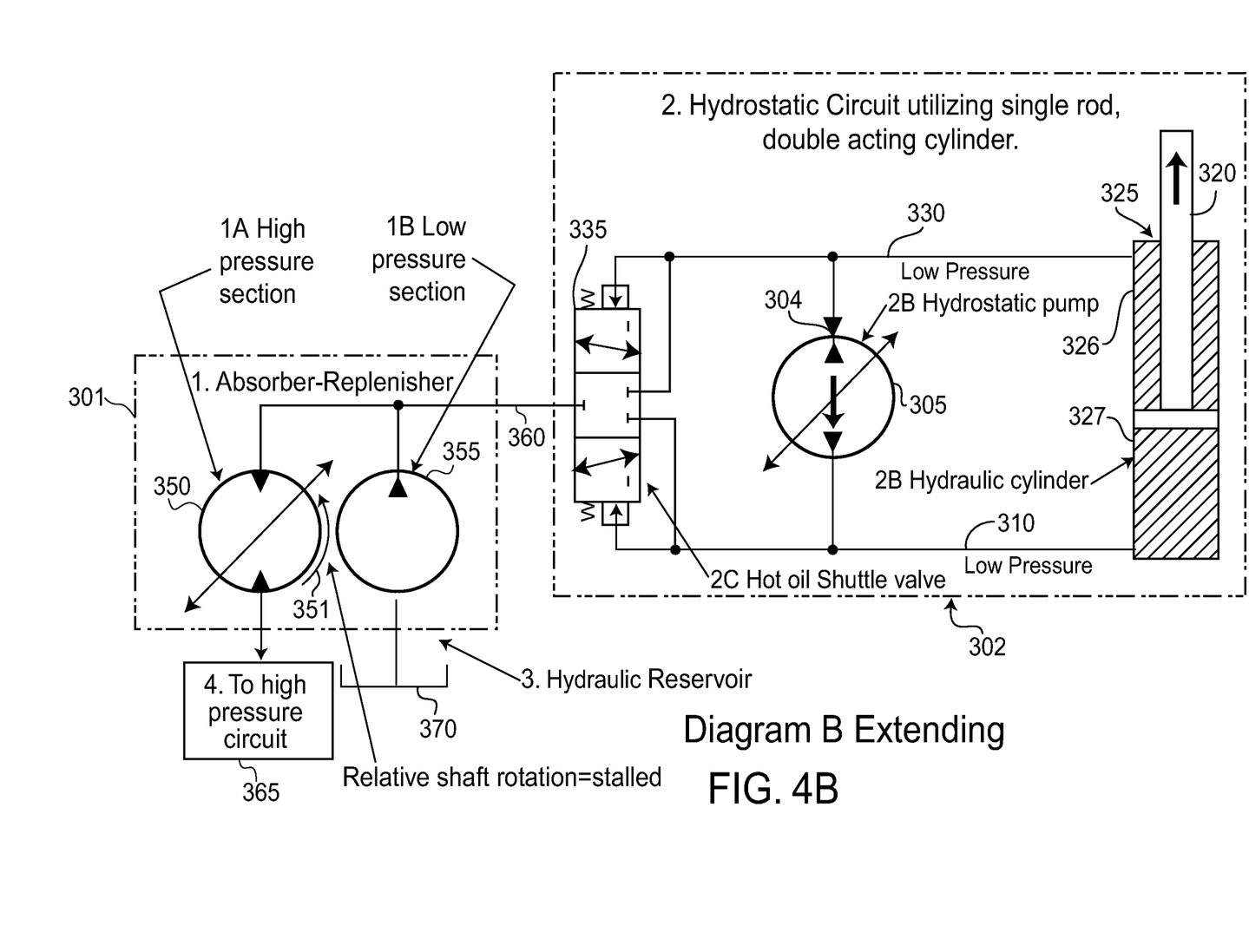

FIG. 4B shows an exemplary embodiment for operation when the hydrostatic circuit operates to maintain a static cylinder position. The hydrostatic pump 305 supplies fluid only to maintain position and compensate for fluid loss. The two sides 310 and 330 of the hydrostatic circuit 302 are essentially the same pressure, with the single rod 320 of the double acting hydraulic cylinder 325 stationary. The supply fluid flow to the large area 327 of the hydraulic cylinder 325 and rod side 326 of the hydraulic cylinder 325 essentially equal, as the hydrostatic pump functions only to compensate for any leakage.

The hot oil shuttle valve 335 remains shut, isolating the absorber-replenisher 301 from the hydrostatic circuit 302. The low pressure side 360 of the absorber-replenisher 302 remains at a constant pressure (e.g., 150 to 250 psi). The constant pressure differential maintains a balanced torque, and the variable displacement bidirectional hydraulic pump-motor 350 (e.g., piston motor) remains stationary, blocking fluid flow from the high-pressure circuit 365 (e.g., HOC fan circuit). The common shaft remains stationary, as the stalled shaft 351 does not rotate the low pressure section fixed displacement unidirectional hydraulic pump-motor 355 (e.g., gear pump). Hydraulic fluid remains stored in the hydraulic reservoir 370 and the high-pressure circuit 365 (e.g., HOC fan circuit).

Figure 4C:
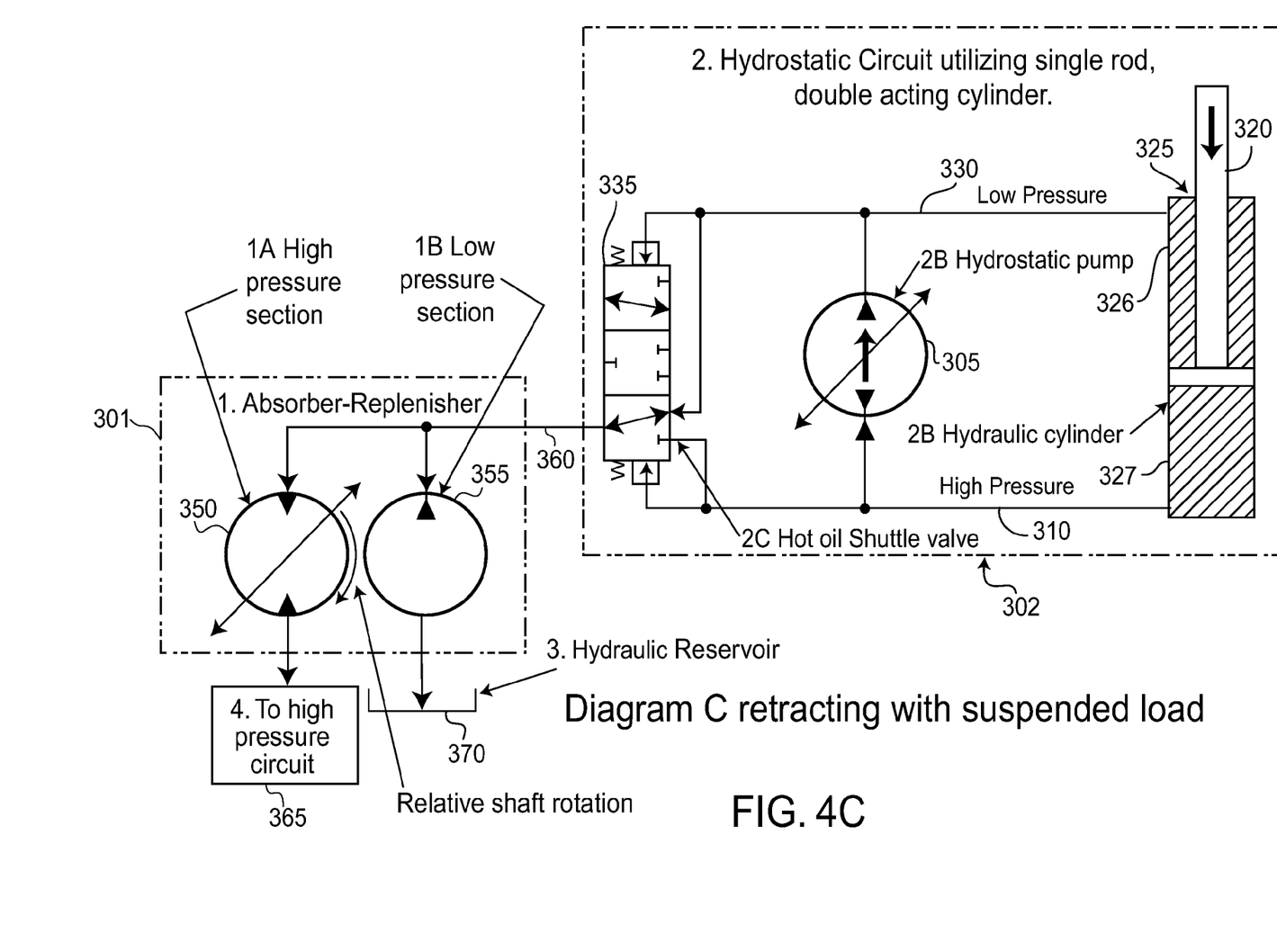

FIG. 4C shows an exemplary embodiment for operation when the hydrostatic circuit operates to retract the cylinder rod in a double acting cylinder with a suspended load. The hydrostatic pump 305 removes fluid from the high pressure side 310 of the hydrostatic circuit 302 as the single rod 320 of the double acting hydraulic cylinder 325 retracts, and supplies fluid to the low pressure side 330. The fluid flow from the large area 327 of the hydraulic cylinder 325 causes it to retract, and it opens the hot oil shuttle valve 335 to connect the absorber-replenisher 301 to the low pressure side 330 of the hydrostatic circuit 302 supplying the smaller annulus rod side 326 of the hydraulic cylinder 325. The increased fluid flow volume from the large cap area 327 of the hydraulic cylinder 325 cannot be absorbed by the hydrostatic pump 305. The hydrostatic pump 305 functions to supply fluid to the smaller annulus area 326 of the hydraulic cylinder 325.

The low pressure side 360 of the absorber-replenisher 302 connects to the low pressure smaller annulus side 330 of the hydrostatic circuit 302. Because of the increased fluid volume in the hydrostatic circuit due to the volume differential between the smaller annulus rod side 326 and the large area 327 of the hydraulic cylinder 325, an increased fluid flow volume is returned to the smaller annulus area 326 of the cylinder 325. The pressure in the low pressure portion 330 of the hydrostatic circuit 302 increases from the increased fluid flow. This likewise causes a pressure increase in the low pressure side 360 of the absorber-replenisher 302, decreasing the pressure differential across the low pressure section fixed displacement unidirectional hydraulic pump-motor 355. The changing pressure differential unbalances the torque causing the fixed displacement unidirectional hydraulic pump-motor 355 (e.g., gear pump) to rotate. This occurs because the torque differential on the low pressure side pump-motor 355 of the absorber-replenisher 301 is greater than that on the high pressure side pump-motor 350.

The fluid flow through the low pressure section of the absorber-replenisher 302 from the low pressure side 360 causes the low pressure section hydraulic pump-motor 355 to rotate due to the induced torque. As the common (or linked) shaft rotates the high pressure section variable displacement bidirectional hydraulic pump-motor 350 (e.g., piston motor), it pumps fluid into the high pressure circuit 365. The positive rotation 351 pumps hydraulic fluid into high pressure circuit 365 from the low pressure side 360 of the absorber-replenisher 302, from the hot oil shuttle valve 335, and from the low pressure side 330 of the hydrostatic circuit 302. Fluid flow also goes into the hydraulic reservoir 370 as the pump-motor 355 rotates.

Once the absorber fluid flow decreases the pressure in the low pressure side 330 of the hydrostatic circuit 302 to the appropriate value to balance the torque operating on the low pressure section pump-motor 355, the absorber-replenisher 302 stalls due to the equilibrium of the differential torque across the hydraulic reservoir side 375 and the low pressure side 360, respectively, which ceases the positive rotation 351.

Figure 4D:
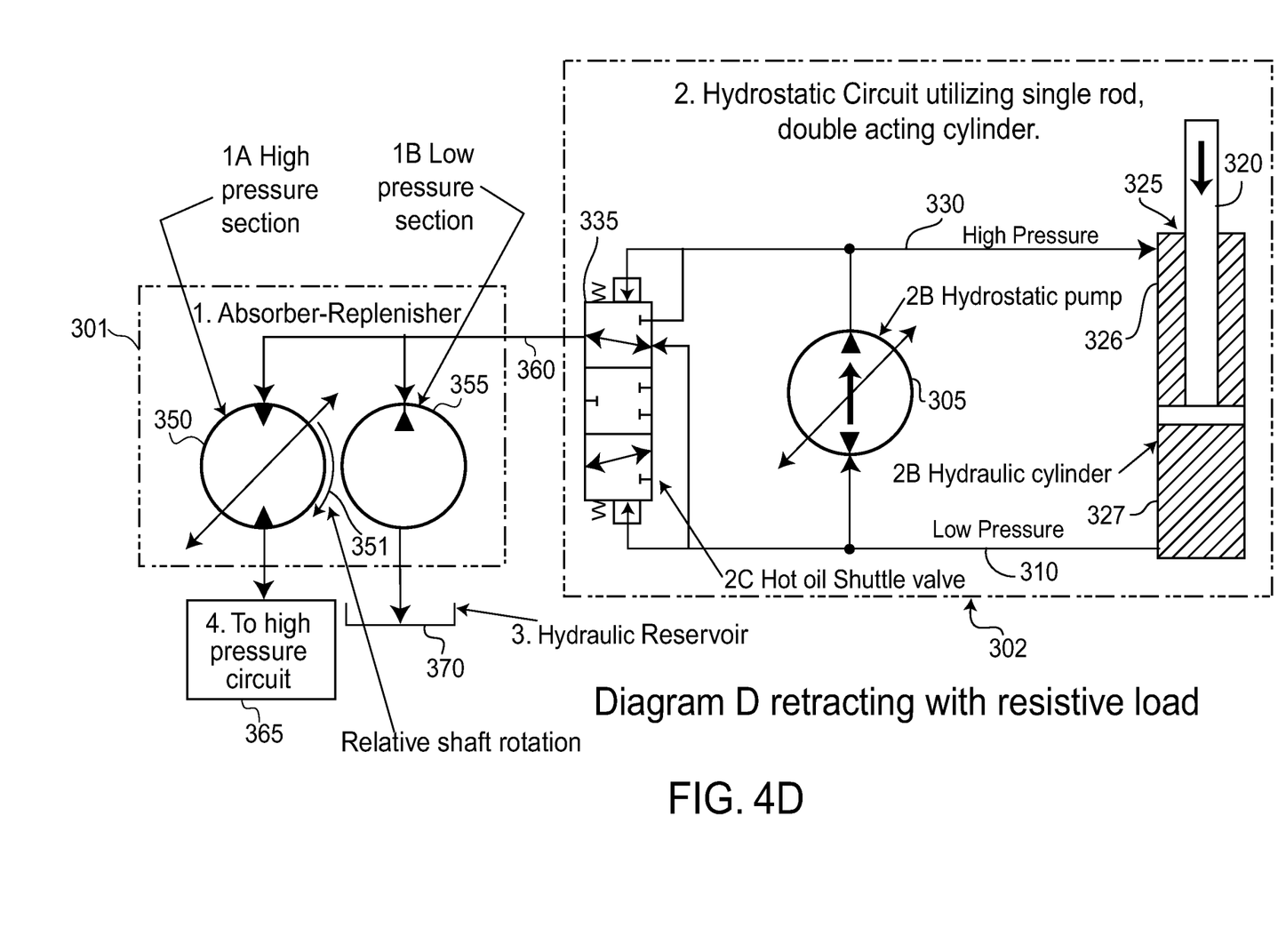

FIG. 4D shows an exemplary embodiment for operation when the hydrostatic circuit operates to retract the cylinder rod in a double acting cylinder with a resistive load. The hydrostatic pump 305 supplies fluid to the high pressure side 330 of the hydrostatic circuit 302 as the single rod 320 of the double acting hydraulic cylinder 325 retracts, and receives fluid from the low pressure side 330. The fluid flow into the smaller annulus area, single rod side 326 of the hydraulic cylinder 325 causes it to retract, and it opens the hot oil shuttle valve 335 to connect the absorber-replenisher 301 to the low pressure side 310 of the hydrostatic circuit 302 receiving the larger annulus large cap side 327 of the hydraulic cylinder 325. The increased fluid flow volume from the large cap area 327 of the hydraulic cylinder 325 cannot be absorbed by the hydrostatic pump 305. The hydrostatic pump 305 functions to supply fluid to the smaller annulus area 326 of the hydraulic cylinder 325.

The low pressure side 360 of the absorber-replenisher 302 connects to the low pressure smaller annulus side 330 of the hydrostatic circuit 302. Because of the increased fluid volume in the hydrostatic circuit due to the volume differential between the smaller annulus rod side 326 and the large area 327 of the hydraulic cylinder 325, an increased fluid flow volume is returned to the smaller annulus area 326 of the cylinder 325. The pressure in the low pressure portion 330 of the hydrostatic circuit 302 increases from the increased fluid flow. This likewise causes a pressure increase in the low pressure side 360 of the absorber-replenisher 302, decreasing the pressure differential across the low pressure section fixed displacement unidirectional hydraulic pump-motor 355. The changing pressure differential unbalances the torque causing the fixed displacement unidirectional hydraulic pump-motor 355 (e.g., gear pump) to rotate. This occurs because the torque differential on the low pressure side pump-motor 355 of the absorber-replenisher 301 is greater than that on the high pressure side pump-motor 350.

The fluid flow through the low pressure section of the absorber-replenisher 302 from the low pressure side 360 causes the low pressure section hydraulic pump-motor 355 to rotate due to the induced torque. As the common (or linked) shaft rotates the high pressure section variable displacement bidirectional hydraulic pump-motor 350 (e.g., piston motor), it pumps fluid into the high pressure circuit 365. The positive rotation 351 pumps hydraulic fluid into high pressure circuit 365 from the low pressure side 360 of the absorber-replenisher 302, from the hot oil shuttle valve 335, and from the low pressure side 330 of the hydrostatic circuit 302. Fluid flow also goes into the hydraulic reservoir 370 as the pump-motor 355 rotates.

Once the absorber fluid flow decreases the pressure in the low pressure side 330 of the hydrostatic circuit 302 to the appropriate value to balance the torque operating on the low pressure section pump-motor 355, the absorber-replenisher 302 stalls due to the equilibrium of the differential torque across the hydraulic reservoir side 375 and the low pressure side 360, respectively, which ceases the positive rotation 351.

The foregoing has described methods and systems for a absorber-replenisher in hydrostatic circuits that are given for illustration and not for limitation and uses. Thus the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

According to various embodiments, there is provided: An absorber-replenisher incorporated in a hydrostatic circuit powering a drilling rig sub-system, comprising: a first hydraulic pump-motor and a second hydraulic pump-motor with coupled shafts; a reservoir port on the first hydraulic pump-motor connected to a hydraulic reservoir and a low pressure port on the first hydraulic pump-motor connected to a first hydrostatic circuit; and a high pressure port on the second hydraulic pump-motor connected to a high pressure hydraulic circuit and a low pressure port on the second hydraulic pump-motor connected to the first hydrostatic circuit; whereby a change in pressure in the first hydraulic circuit induces a torque on the first or second hydraulic motors.

According to various embodiments, there is provided: An absorber-replenisher connected to a hydrostatic circuit powering a drilling rig subsystem, comprising: a first hydraulic pump-motor and a second hydraulic pump-motor with connected shafts; a reservoir port of the first hydraulic pump-motor connected to a hydraulic reservoir and a low pressure port of the first hydraulic pump-motor connected to a first hydrostatic circuit; and a high pressure port of the second hydraulic pump-motor connected to a second hydraulic circuit and a low pressure port of the second hydraulic pump-motor connected to the first hydrostatic circuit; wherein the first hydraulic pump-motor and the second hydraulic pump-motor possess a balanced torque at a predetermined pressure in the first hydrostatic circuit.

According to various embodiments, there is provided: An absorber-replenisher device, comprising: a first hydraulic pump-motor and a second hydraulic pump-motor coupled so their respective shafts rotate in unison and designed to operate with a differential torque; an operating hydrostatic circuit that requires a replenishing fluid flow to raise pressure or an absorbing fluid flow to lower pressure; wherein the absorber-replenisher operates to absorb or replenish fluid flow.

According to various embodiments, there is provided: An absorber-replenisher in a hydrostatic circuit, comprising: a first hydraulic pump-motor and a second hydraulic pump-motor with linked shafts responsive to a differential torque causing one hydraulic pump-motor to rotate the other and move hydraulic fluid between a high pressure side and a lower pressure side.

According to various embodiments, there is provided: A method for operating a hydrostatic circuit, comprising the steps of: responding to a decreased replenishment flow in the hydrostatic circuit and pressure decrease to allow a differential torque to turn a first hydraulic pump-motor and pump fluid from the reservoir into the hydrostatic circuit until the torque at a rotating second pump-motor reaches equilibrium; or responding to an increased replenishment flow in the hydrostatic circuit and pressure increase to allow a differential torque to turn the second hydraulic pump-motor and pump fluid from the hydrostatic circuit until the torque at the rotating first pump-motor reaches equilibrium.

According to various embodiments, there is provided: A method for performing an operation in a hydrostatic circuit, comprising the steps of: (a) reducing replenishment flow in a hydrostatic circuit to cause a pressure decrease sufficient to permit a high pressure hydraulic circuit to provide fluid flow to the hydrostatic circuit through a second hydraulic pump-motor and rotate the shaft of a first hydraulic pump-motor and pump fluid from a reservoir into the hydrostatic circuit until a torque reaches equilibrium; or (b) increasing replenishment flow in the hydrostatic circuit to cause a pressure increase sufficient to reverse direction of flow through a first hydraulic pump-motor to rotate the shaft of the second hydraulic pump-motor to pump fluid from the hydrostatic circuit into the high pressure hydraulic circuit until a torque reaches equilibrium; wherein the shaft of the first and second hydraulic motor rotate together.

According to various embodiments, there is provided: A method for a combustion powered hydrostatic circuit to actuate a hydraulic device in a drilling rig system, comprising the steps of: connecting a low pressure side of the hydrostatic circuit to a common port of a high pressure section and a low pressure section of an absorber-replenisher; operating the hydrostatic circuit to (a) require a replenishing hydraulic fluid flow to the hydrostatic circuit, the decreased replenishment flow causing a pressure drop that results in a torque differential that turns a high pressure section hydraulic pump-motor to rotate a low pressure section hydraulic pump-motor and pump fluid into the hydrostatic circuit; or (b) require an absorbing hydraulic fluid flow from the hydrostatic circuit, the increased replenishment flow causing a pressure increase that results in a torque differential that turns the low pressure section hydraulic pump-motor to rotate the high pressure section hydraulic pump-motor and pump fluid from the hydrostatic circuit; whereby total energy consumption required and total pollution from the combustion engine are reduced for a given sequence of hydraulic operations.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Due to the potential of flow rates being larger than can be accommodated by currently available pump-motors, it is possible to combine multiple sections in either function. (e.g., two low pressure sections to accommodate very large low pressure flow requirements). Configurations are possible where multiple high pressure and low pressure circuits are coupled to a common absorber-replenisher. Other possible variations could couple multiple absorber-replenishers to a common high pressure and common low pressure circuit.

In situations where the load is consistently on one side of the cylinder, such as a suspended load only on the cap end of a cylinder, it may be possible to attach the absorber-replenisher only to the low pressure side (e.g., the rod end) of the cylinder. In the event that it is occasionally necessary to develop a high pressure in the opposite direction, additional valving can be incorporated to change which side of the cylinder the absorber-replenisher is attached to.

If there are multiple pressures required by the overall hydrostatic/hydraulic system, use of three or more stages can provide a variety of pressures to different circuit portions. Multiple absorber-replenishers can be incorporated between multiple pressure stages. What is most critical is the presence of a pressure differential between a higher and a lower pressure circuit to induce the operating torque differential. A multi-pressure system can use multiple absorber-replenishers to transfer fluid and store energy between the different pressure level portions of a system or even separate systems.

Using variable displacement components can provide discrete operation when pressure demands/requirements of the respective circuits varies and optimal energy utilization is desired.

An integral pump motor can be used with both high and low pressure sections located together in a common housing.

Multiple pump-motors can be used to implement the high pressure and low pressure sections of the absorber-replenisher, and these multiple pump-motors can be connected to singular multiple discrete circuits of high pressure and low pressure. Fluid could be absorbed into or replenished from multiple circuits. Another variation could have connections among different circuit, so an absorber-replenisher on one circuit could also be connected to another. Thus, in one variation a pressure differential in one circuit could also be used to add fluid or absorb fluid in a separate circuit.

Another variation uses the absorber-replenisher in conjunction with two additional cylinders; one cylinder functioning at low pressure and the other at high pressure. The high pressure in the high pressure cylinder can be due to a weight or spring force acting on a piston. The absorber-replenisher moves fluid between the two cylinders and the hydrostatic circuit.

The hydrostatic circuit embodiment depicted is exemplary only. The absorber-replenisher can be incorporated into any hydrostatic or hydraulic circuit.

The connection between the hydraulic pump-motors is described as a common shaft. It should obvious that other configurations are possible, such as a gear linkage, an offset linkage using a joint, a universal joint, or other mechanical connection systems or even a hydraulic linkage.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An absorber-replenisher incorporated in a hydrostatic circuit powering a drilling rig sub-system, comprising:
   a first hydraulic pump-motor and a second hydraulic pump-motor with coupled shafts;
   a reservoir port on the first hydraulic pump-motor connected to a hydraulic reservoir and a low pressure port on the first hydraulic pump-motor connected to a first hydrostatic circuit; and
   a high pressure port on the second hydraulic pump-motor connected to a high pressure hydraulic circuit and a low pressure port on the second hydraulic pump-motor connected to the first hydrostatic circuit;
   whereby a change in pressure in the first hydraulic circuit induces a torque on the first or second hydraulic motors.

2. The absorber-replenisher of claim 1, wherein the first hydraulic pump-motor and the second hydraulic pump-motor rotate due to a torque to either replenish fluid to the first hydrostatic circuit or absorb surplus energy for use from the first hydrostatic circuit.

3. The absorber-replenisher of claim 1, wherein a first hydrostatic circuit pressure substantially less than a predetermined value causes positive torque at the second hydraulic pump-motor to thereby rotate the first hydraulic pump-motor to pump hydraulic fluid from the hydraulic reservoir.

4. The absorber-replenisher of claim 1, wherein a first hydrostatic circuit pressure substantially greater than a predetermined value causes a negative torque at the first hydraulic pump-motor to thereby rotate the second pump-motor and pump oil into the high pressure hydraulic circuit.

5. The absorber-replenisher of claim 1, wherein the shafts are mechanically coupled.

6. The absorber-replenisher of claim 1, wherein the shafts comprise a common shaft.

7. The absorber-replenisher of claim 1, wherein torque depends on a pressure change in a low pressure side of the hydrostatic circuit and a high pressure circuit.

8. The absorber-replenisher of claim 1, wherein the hydraulic reservoir comprises a low pressure hydraulic circuit.

9. An absorber-replenisher connected to a hydrostatic circuit powering a drilling rig subsystem, comprising:
   a first hydraulic pump-motor and a second hydraulic pump-motor with connected shafts;
   a reservoir port of the first hydraulic pump-motor connected to a hydraulic reservoir and a low pressure port of the first hydraulic pump-motor connected to a first hydrostatic circuit; and
   a high pressure port of the second hydraulic pump-motor connected to a second hydraulic circuit and a low pressure port of the second hydraulic pump-motor connected to the first hydrostatic circuit;
   wherein the first hydraulic pump-motor and the second hydraulic pump-motor possess a balanced torque at a predetermined pressure in the first hydrostatic circuit.

10. The absorber-replenisher of claim 9, wherein the first hydraulic pump-motor and the second hydraulic pump-motor jointly rotate to function as an absorber when pressure in the first hydrostatic circuit exceeds the predetermined pressure.

11. The absorber-replenisher of claim 9, wherein the first hydraulic pump-motor and the second hydraulic pump-motor jointly rotate to function as a replenisher when the predetermined pressure exceeds the pressure in the first hydrostatic circuit.

12. The absorber-replenisher of claim 9, further comprising a hydraulic oil cooler in the second hydraulic circuit.

13. The absorber-replenisher of claim 10, wherein the absorber-replenisher when operated as an absorber pumps fluid from the first hydrostatic circuit into the second hydraulic circuit.

14. The absorber-replenisher of claim 9, wherein the absorber-replenisher when operated as an absorber pumps fluid from the first hydrostatic circuit into the second hydraulic circuit.

15. The absorber-replenisher of claim 9, wherein the hydraulic reservoir comprises a low pressure hydraulic circuit.

16. An absorber-replenisher device, comprising:
   a first hydraulic pump-motor and a second hydraulic pump-motor coupled so their respective shafts rotate in unison and designed to operate with a differential torque;
   an operating hydrostatic circuit that requires a replenishing fluid flow to raise pressure or an absorbing fluid flow to lower pressure;
   wherein the absorber-replenisher operates to absorb or replenish fluid flow.

17. The absorber-replenisher of claim 16, wherein during replenishing fluid flow, a positive torque differential causes the second hydraulic pump-motor to turn and rotate the first hydraulic pump-motor to pump fluid from a reservoir.

18. The absorber-replenisher of claim 16, wherein during absorber fluid flow, a negative torque differential causes the first hydraulic pump-motor to turn and rotate the second hydraulic pump-motor to pump fluid into a high pressure hydraulic circuit.

19. The absorber-replenisher of claim 16, wherein the torque differential results from a pressure difference between a commonly connected portion of the hydrostatic circuit to respective ports of the first hydraulic pump-motor and second hydraulic pump-motor the reservoir and the high pressure circuit.

20. The absorber-replenisher of claim 16, wherein the first hydraulic pump-motor and the second hydraulic pump-motor are coupled by a common shaft.

* * * * *